United States Patent Office 2,739,922
Patented Mar. 27, 1956

2,739,922

MIXTURES OF POLYMERIC N-VINYL PYRROLIDONE AND HALOGENS

Herman A. Shelanski, Philadelphia, Pa.

No Drawing. Application March 13, 1952,
Serial No. 276,449

12 Claims. (Cl. 167—70)

This invention relates to improved novel compositions containing halogens and polymeric N-vinyl pyrrolidone.

I have discovered that polymeric N-vinyl-α-pyrrolidone of the type described in U. S. P. 2,265,450 in combination with halogens and organic and inorganic substances derived from and containing halogens or capable of setting free halogens in solution materially lowers the toxicity and sensitizing effects of the halogens on animal life without affecting, and in fact, in many cases enhancing the killing effect of such halogen compounds on microorganisms, i. e., bacteria, yeasts, molds, fungi, protozoa, and metazoa.

This discovery makes possible the formulation of a wide variety of compositions containing such halogen compounds in conjunction with polyvinyl pyrrolidone which are of value in substantially the same use as the unmodified halogen compounds but are free of many of the objectionable properties of such unmodified halogen compounds and thus may be employed with greater safety than the unmodified compounds and in more effective concentrations.

The present invention does not relate to any novel halogen compounds per se but instead relates to the combination of known halogen compounds having bactericidal, therapeutic or diagnostic uses with polyvinyl pyrrolidone, such combinations having decreased toxicity and substantially less irritation and sensitizing effects than the halogen compounds per se, but in many cases showing synergistic effect. Such combinations, depending upon the particular halogen compound employed, may be employed for local application to the skin, in ointments, creams, jellies, suppositories and the like, or may be employed as parenteral or intromuscular injections. In addition to decreasing the toxicity and irritation and sensitization effects of the halogen compounds, it has been found that the presence of polyvinyl pyrrolidone substantially prolongs the application of the halogen when it is used therapeutically or otherwise in situ. Thus the addition of small amount of polyvinyl pyrrolidone to water, for instance, in a swimming pool, substantially prolongs the effect of a given quantity of chlorine.

As stated above, the polymeric N-vinyl-α-pyrrolidone compounds which I found to be useful combined with halogens and halogen containing compounds in the compositions of the present invention are the polymeric N-vinyl-α-pyrrolidones of the type described in the U. S. Patent 2,265,450. I have found that the water soluble polymers of N-vinyl pyrrolidone as a class are effective in the compositions of this invention and that the degree of polymerization (i. e. molecular weight of the polymer) has no apparent effect on its detoxifying action. However, for particular uses polymers of particular molecular weight range may be preferred for reasons other than their detoxifying effect. The Fickentscher K value is a convenient designation of relative degree of polymerization or relative molecular weight and will therefore be used to designate specific polymers in this specification.

Thus, polymers having a K value below 15, and particularly below 10, are rapidly excreted from the body in the urine when administered in parenteral fluids, and when it is desired to detoxify a halogen compound and to have that compound excreted normally such low K value polymers will usually be preferred. Polymers having K values within the range of 15, to say 75 and preferably 25 to 50, appear to be excreted from the body more slowly. Moreover, the osmotic pressure of solutions of polymers within this range of K values appears to be better suited for the preparation of parenteral fluids and therefore such polymers will usually be preferred in compositions intended for use in parenteral fluids or where it is desired to prolong the presence and effect of the composition. The higher polymers, i. e. those having a K value above 50 and especially above 75, to say 90, appear to be stored in the liver for appreciable periods of time and such high molecular weight products may, therefore, be preferred in compositions intended for therapy of the liver or where it is desired to have the therapeutic or diagnostic agent incorporated therein remain in the body for long periods of time. The water soluble polymers of N-vinyl pyrrolidone have been extensively employed as blood plasma substitutes and appear to be entirely innocuous. While for certain purposes a polymer for a particular weight range may be desired, the detoxifying effect does not appear to be related to the molecular weight and the range of molecular weight of a particular polymer to be employed in any given application will be governed by considerations other than this detoxifying action. Such considerations are well known in the medical profession and the proper choice of polymer may readily be made. For external use the molecular weight (K value) of the polymer appears to be without effect save for its effect on the viscosity of the composition.

The present invention will first be described in detail in connection with its use with inorganic irritating forms of halogens. Thus the addition of a small amount of polyvinyl pyrrolidone to elemental iodine was effective in decreasing the toxicity of iodine solutions very substantially. The inorganic forms of iodine with which polyvinyl pyrrolidone may be used include elemental iodine, Lugol's solution, collodial iodine suspensions, salts of iodine, iodides, iodates and iodites and acids of iodine, HI and HIO.

It was found that in such combinations of iodine and polyvinyl pyrrolidone, the acute toxicity of iodine was lowered approximately 10-fold average, and the lowering of the chronic toxicity resulted in very substantial increase in the average daily consumption. The irritation and sensitization effects of iodine were completely absent in iodine polyvinyl pyrrolidone combinations. The objectionable staining properties of the iodine were overcome, and the odor of iodine was not noticeable. At the same time, it was noted that the preseence of a polyvinyl pyrrolidone in the composition did not effect the bactericidal function of the iodine as free elemental iodine and in fact it was found that combinations of iodine and polyvinyl pyrrolidone were more active bactericidally than free iodine itself. It was found that while there was no conclusive evidence of any chemical combination between the iodine and the polyvinyl pyrrolidone, it appears that such combination possesses distinctive properties which possibly may be due to the formation of a new form of matter. Thus when a small amount of polyvinyl pyrrolidone is added to Lugol's solution and the thus formed mixture heated on a steam bath, a starch test for iodine could not be obtained on paper suspended over the bath and no odor of iodine could be detected, the vapor pressure of iodine being substantially reduced to 0. This mixture of iodine and Lugol's solution was subjected to standard culture tube tests as illustrated in Series A of Table I below using 1 ml. 24 hour *Staph. aureus* broth culture to each tube of test broth culture and 1 per cent Lugol's iodine was added to the culture broth to the indicated dilution.

In the tables polyvinyl pyrrolidone is abbreciated as PVP.

Table I

SERIES A

| Nutrient Broth in— | 1/25 | 1/50 | 1/100 | 1/150 | 1/300 | 1/400 | 1/600 |
|---|---|---|---|---|---|---|---|
| H₂O-base: | | | | | | | |
| 24 hours | − | + | ++ | ++ | ++ | ++ | ++ |
| 48 hours | | ++ | ++ | ++ | ++ | ++ | ++ |
| 1% PVP—H₂O-base: | | | | | | | |
| 24 hours | − | − | − | − | − | + | ++ |
| 48 hours | − | − | ++ | ++ | ++ | ++ | ++ |

SERIES B

| Nutrient Broth in— | 1/20 | 1/40 | 1/80 | 1/160 | 1/320 |
|---|---|---|---|---|---|
| H₂O-base: | | | | | |
| 24 hours | − | ++ | ++ | ++ | |
| 48 hours | | ++ | ++ | ++ | |
| 1% PVP—H₂O-base: | | | | | |
| 24 hours | − | − | − | − | ++ |
| 48 hours | − | − | − | ++ | ++ |
| 72 hours | − | − | ++ | ++ | ++ |

It will be noted that the Lugol's solution was effective at a dilution of 1 to 25, whereas the same solution containing 1 per cent polyvinyl pyrrolidone was effective at dilutions of 1 to 300. Substantially similar results were obtained in agar cup plat tests as indicated by the following tables in which 2.0 ml. of a 24 hour *Staph. aureus* culture was used per 100 ml. agar.

Table II

| Dilutions in | Width of— | Dilutions in | Width of— |
|---|---|---|---|
| H₂O | Zones, mm. | PVP—2.5% | Zones, mm. |
| 1/2 | 10 | 1/2 | 13 |
| 1/10 | 3 | 1/10 | 8 |
| 1/50 | 0.5 | 1/50 | 2 |
| 1/100 | 0.0 | 1/100 | 0.0 |

Table III

| Concentrations of PVP | Width of Zone, mm. |
|---|---|
| 2.5% | 7 |
| 1.25% | 7 |
| 0.63% | 6 |
| 0.313% | 3 |
| H₂O Control | 3 |
| 2.5% Gelatin | 1.5 |
| 2.5% Gelatin (no Iodine) | 0.0 |

The stability of iodine in polyvinyl pyrrolidone-iodine compositions is not to be regarded as due principally to $I_3^-$ formation by the $I^-$ present in these compositions. Spectrophotometric analysis shows that an ordinary dilute iodine-KI solution to have an absorption peak of 355 mu and a small shoulder of 420 mu. Polyvinyl pyrrolidone-iodine solutions of similar concentration, although showing a peak of 355 mu exhibit a pronounced broadening at 420 mu. The spectrum of polyvinyl pyrrolidone-iodine solution, using iodine-KI as a blank, showed a small peak of 355 mu and a high peak of 420 mu having more than twice the intensity. This indicates that there is some absorption due to $I_3^-$ formation, but the greater proportion of the iodine is bound otherwise. The addition of KI to a polyvinyl pyrrolidone iodine solution causes a drastic decrease in the oxidation potential. The KI-iodine solutions have a much lower oxidation potential than polyvinyl pyrrolidone-iodine solutions of the same iodine content. The addition of KI to a polyvinyl pyrrolidone-iodine solution causes a shift in color towards the ultraviolet. Oxygen containing organic iodine solutions give characteristically redder or browner solutions than $I_3^-$ complexes. The formation of complexes such as $I_5^-$, $I_7^-$, and $I_9^-$ take place, as a rule, only in higher polar organic solutions with cations certainly not to be found in polyvinyl pyrrolidone-iodine solutions.

This novel combination or complex of polyvinyl pyrrolidone and iodine is, as indicated previously, readily prepared by mixing a solution of polyvinyl pyrrolidone in a solvent such as methanol, ethanol, or methylene chloride with a solution of iodine in a similar solvent. Advantageously an aqueous solution of polyvinyl pyrrolidone may be added to an aqueous solution of iodine such as Lugol's solution and mixing; in this case the solution of polyvinyl pyrrolidone is preferably added to the Lugol's solution since mixing is readily effected when addition is in this order, while when the converse order or addition is used, there is a tendency for a precipitation to be formed and difficulty may be encountered in obtaining a uniform composition. The thus obtained mixed solutions which contain the polyvinyl pyrrolidone iodine complex may be used as such or, if desired, may be dried and the dry powder used as a powder. This dry powder is readily redissoluble in water and may be redissolved for use, if desired.

It has also been found that the polyvinyl pyrrolidone appears to act as solvent for iodine and the novel complex or combination of polyvinyl pyrrolidone and iodine of the present invention may be prepared by intimately mixing (for example, by grinding in a mortar and pestle or in a ball or pebble mill) elemental iodine and the dry polymer. As high as 35 per cent iodine by weight has been incorporated in polyvinyl pyrrolidone in this manner. Such dry mixtures are as readily dissolved in water as the polymer used in producing them and it has been found that polyvinyl pyrrolidone ground with iodine until as high as 25 per cent by weight of iodine is incorporated therein forms a homogenous solution in water from which iodine is not precipitated by further dilution. It appears that not all the iodine incorporated in polyvinyl pyrrolidone by dry mixing or grinding is in the form of a complex or some other combination, particularly where large amounts of iodine such as 20 to 25 per cent by weight of the polymer are used since an appreciable amount of iodine can be extracted by washing with ether and such dry compositions still retain a sensitizing or irritating effect on the skin although this sensitizing or irritating effect is markedly decreased. However, by first grinding dry iodine and dry polyvinyl pyrrolidone polymer together and then dissolving it in water and drying the solution, there is obtained a composition in which the iodine is in some way combined with the polymer so that iodine is no longer removed therefrom by washing with ether and the dry powder no longer has an irritating or sensitzing effect on the skin.

It has also been found that by heating a dried mixture of polyvinyl pyrrolidone and iodine while stirring the same or grinding in a ball mill that the iodine may be completely blended with the polyvinyl pyrrolidone so that a stable homogenous composition in which the iodine is completely combined with the polyvinyl pyrrolidone is obtained in a short time. This method of dry blending and stabilizing polyvinyl pyrrolidone composition is more fully described and claimed in the copending application Serial No. 282,458 of Beller et al., filed April 15, 1952, now Patent No. 2,706,701.

Dry products containing polyvinyl pyrrolidone and iodine in the form of a complex or other combination may also be prepared by suspending dry polyvinyl pyrrolidone in a solution of iodine in a non-solvent for polyvinyl pyrrolidone, for example, 5 grams of polyvinyl pyrrolidone were suspended in 100 ml. of a solution prepared by dissolving 2 grams of iodine in 10 ml. of methylene chloride and diluting to 250 ml. with benzene. This suspension was allowed to stand for 18 hours with occasional agitation and the suspended polymer then filtered, washed with benzene and dried. There was obtained a brown powder of polyvinyl pyrrolidone which had combined with or dissolved iodine from the solution. This powder was soluble in water, alcohol, acetic acid, etc. and, when analyzed was found to contain 11.78 per cent iodine of which 3.64 per cent was detectable as iodine ion and 8.14 was detectable as free iodine. The product further had no odor of iodine and starch test for iodine could not be obtained holding a starch test over an aqueous solution of the powder on a water bath.

Regardless of the method by which the polyvinyl pyrrolidone and iodine are combined, it has been found that iodine is present in the final composition in three forms. A minor amount is present as bound iodine, and depending on the amount of iodine used, varying proportions of iodine are present as free or available iodine and as iodide ion. A distinction between these forms may be made on an analytical basis, free iodine being determined directly by titrating a solution of the product in water with 0.1 N-sodium thiosulfate ($Na_2S_2O_3$) solution, using starch as an indicator. The amount of iodine present as iodide ion is determined by reducing the iodine-polyvinyl pyrrolidone composition in solution with a 1-N sodium acid sulfite ($NaHSO_3$), adding enough to make the solution colorless, then adding 0.1 N-silver nitrate and enough nitric acid to make the solution acid and back-titrating with ammonium thiocyanate ($NH_4SCN$). The iodide ion is the difference between this figure and the available iodine as determined above. The total iodine may be determined by combustion methods such as that formulated by Hallet in Scott's Standard Methods of Chemical Analyses, vol. 2, pp. 2497–8 (D. Van Nostrand Co. N. Y. 1929): bound iodine then being determined by subtracting the sum of free iodine and iodine ion from the total iodine so determined.

It has been found that only relatively small amounts of iodine are present in polyvinyl pyrrolidone compositions of the present invention in the form of bound iodine. This loss of iodine in the form of bound iodine may represent the uptake of iodine by terminal unsaturation of the polyvinyl pyrrolidone. This combination takes place rapidly and it has been found that the amount of iodine present in my composition as bound iodine varies with different batches of polymer. However, the amount so combined is constant for any given batch of polymer. This loss is negligible except in preparing a composition having a low iodine concentration with large amounts of polyvinyl pyrrolidone.

It has also been found that when a freshly prepared polyvinyl pyrrolidone composition is allowed to stand that the relative proportions of iodine present as free iodine and iodide ion may vary somewhat. On standing, the amount of free iodine frequently slowly decreases while the amount of iodide ion increases. It has been found, however, that when the ratio of free iodine to iodide ion is substantially 2:1 that the product is stable and further variation in the relative proportions of free iodine to iodide ion occur only, if at all, very slowly. Such a stable composition of iodine and polyvinyl pyrrolidone in which the ratio of free iodine to iodide ion is about 2:1 are readily obtained in solution in a short time. In a dried blended product, considerable time is required for such a stable composition to be obtained. However, in accordance with the process described in the above mentioned Beller et al. application, such a stable product is obtained in a short time by heating while dry blending polyvinyl pyrrolidone and iodine. Once a polyvinyl pyrrolidone-iodine composition has become stabilized, there is no significant change in the iodine content over a long time. A small loss in iodine content may be ascribed to iodine evaporation, leakage and reaction with oxidizable closures. Thus, a polyvinyl pyrrolidone-iodine solution containing 11.5 per cent polyvinyl pyrrolidone and 1.8 per cent iodine was diluted 1:10 and 1:100. The undiluted solution and the two diluted solutions were stored in white glass 4-oz. bottles wtih plastic caps having a paper disc. At the start of the test, the analysis showed solutions containing 1.78%, 0.174% and 0.017% iodine, respectively. The pH values of the solutions were 1.9, 2.8 and 3.6, respectively. The solutions were analyzed five times during the test period. On the conclusion of the test, after five and one-half months, the iodine percentages were 1.61, .180 and 0.016 per cent; the pH values were 1.7, 2.7 and 3.7, respectively. Examination of the bottle caps showed considerable corrosion of the paper disc. The plastic cap, itself, was entirely unaffected. The caps were never screwed tightly to avoid difficulty in opening should some polyvinyl pyrrolidone remain on the threads.

A series of four polyvinyl pyrrolidone-iodine solutions were prepared from a polyvinyl pyrrolidone iodine powder containing 15% iodine, extra polyvinyl pyrrolidone was added to three solutions. The solutions were stored in white glass bottles with plastic caps, separated from the glass rim by paper discs. Solutions No. 0 and 1 had a detectable iodine odor; Nos. 2 and 3 had no iodine odor. After six months of storage the yellowing of the cap in solution No. 2 was slightly noticeable and the cap of No. 3 was hardly yellow. Caps No. 0 and No. 1 were appreciably yellow but not corroded at all. All the pertinent data, including iodine determinations, are given in Table IV below. The polyvinyl pyrrolidone powder used contained 5 per cent water.

Table IV

| Soln. | Wt.15% Powder | Wt. Water | Wt. PVP | Calc. $I_2$ | 3 hrs. | 24 hrs. | 72 hrs. | 5 days | 6 mos. |
|---|---|---|---|---|---|---|---|---|---|
| | G. | G. | G. | Per-cent | Per-cent | Per-cent | Per-cent | Per-cent | Per-cent |
| 0 | 12.5 | 60 | 0 | 2.59 | 2.46 | 2.45 | 2.46 | 2.45 | 2.46 |
| 1 | 12.5 | 63.5 | 1 | 2.44 | 2.32 | 2.32 | | | 2.16 |
| 2 | 12.5 | 63.0 | 3 | 2.39 | 2.19 | 2.20 | | | 2.06 |
| 3 | 12.5 | 60.0 | 5 | 2.43 | 2.28 | 2.29 | 2.25 | 2.19 | 2.12 |

The novel compositions of the present invention, i. e., "complex" of polyvinyl pyrrolidone and iodine may be used either in dried form or in solution, aqueous solutions generally being preferred on account of their cheapness. From a practical standpoint, it is frequently preferable to obtain the product in the dry form and redissolve it in water at the point of use. However, both the solution and dry form of the novel "complex" of the composition of the present invention have wide fields of application.

A 10% solution of polyvinyl pyrrolidone containing about 5 per cent iodine based on the polyvinyl pyrrolidone has been found to be valuable as general antiseptic for first-aid and other purposes (both skin wounds and deep wounds).

The novel polyvinyl pyrrolidone iodine compositions of this invention are suitable for topical application in treatment of diseases and infections produced by bacteria, viruses, and fungi infections of the skin. Both the dried compositions themselves and aqueous solutions may be used on any surface of the body. In addition, the novel iodine polyvinyl pyrrolidone compositions of this invention may be incorporated in the solutions, powders, ointments, jellies, suppositories, etc., used for topical application.

Aqueous solutions of polyvinyl pyrrolidone and iodine have been administered intravenously. As a therapeutic regimen it is preferable to first inject a solution of polyvinyl pyrrolidone then a solution of polyvinyl pyrrolidone containing a small amount of iodine and then inject a solution of polyvinyl pyrrolidone containing a more effective amount of iodine which may also contain other therapeutic agents.

When there is substantial pain, due to wound injury or infection, it has been found that the novel polyvinyl pyrrolidone iodine compounds of the present invention may readily be combined with procaine or other anesthetics by mixing solutions thereof and such solutions employed intramuscularly. While there is no noticeable pain due to the injection of polyvinyl pyrrolidone iodine "complex" of the present invention in the form of solutions, it has been found that procaine in such solutions is of considerable help where there is pain due to wound injury, etc.

The polyvinylpyrrolidone iodine compositions of the present invention are not limited to any concentration. In general, based on dry weights of polyvinylpyrrolidone and iodine, at least about 5% iodine to 95% polyvinylpyrrolidone is preferred since this concentration has been found to be non-toxic when administered orally, intravenously, intramuscularly and topically. Compositions containing larger amounts amounts of iodine up to 10 to 15% by weight based on the weight of polyvinylpyrrolidone have also been found to be non-toxic and non-irritating. They have not, however, been as fully investigated as the composition containing about 5% iodine and 95% polyvinylpyrrolidone having a K value of 30. These compositions, when administered in the form of solutions, for example, intravenously or intramuscularly, may be used in any wide range of concentrations. In other words, they may be employed in hypo- hyper- or isotonic solutions, the isotonic solutions being preferred. In general, an aqueous solution containing from 2.5 to 5% polyvinylpyrrolidone, having a K value of 30 and containing about 5% iodine based on the polyvinylpyrrolidone is to be recommended for intravenous and intramuscular administration. The amount of polyvinylpyrrolidone, in a solution to be administered intravenously or intramuscularly, which is required to produce a solution having the desired viscosity will vary to some extent with the relative degree of polymerization (molecular weight or K value) of the polymer employed. The higher the polymer, the more viscous the solution formed with a given amount of polymer. These solutions may be made up with distilled water and may be autoclaved, if desired, so that, if necessary, distilled water need not be used. Various salt solutions, such as Ringer's solution, may be employed in making up solutions of the polyvinylpyrrolidone iodine compositions of this invention since they are not affected by ordinary solutions of electrolytes.

Where the novel compositions of the present invention are intended for use in general sanitizing, larger amounts of iodine may be incorporated in polyvinylpyrrolidone. It has been found that up to 35% iodine can readily be incorporated in polyvinylpyrrolidone and, when this composition is dissolved in water, iodine is not precipitated on dilution. It may also be desirable to prepare polyvinylpyrrolidone iodine compositions of the present invention containing relatively large amounts of iodine, say 15 to 25%, which are mixed with iodine-free polyvinylpyrrolidone or an iodine-free solution of polyvinylpyrrolidone to produce a solution having the desired iodine content. Once the iodine polyvinylpyrrolidone composition of the present invention has been produced, it is readily soluble in water and further amounts of polyvinylpyrrolidone may readily be added thereto.

The polyvinylpyrrolidone iodine compositions of this invention have been spoken of at times as a "complex" or some form of combination because of the enhancement of the yellow color of an aqueous iodine solution on the addition of an aqueous solution of polyvinylpyrrolidone to it. This enhancement of the yellow color of the iodine solution is somewhat similar to the formation of a blue color by the addition of starch to an aqueous iodine solution. In preparing the novel iodine polyvinylpyrrolidone compositions of this invention by suspending polyvinylpyrrolidone in a solution of iodine in a non-solvent for the polyvinylpyrrolidone, it appears that the iodine transfers from the solution or adsorption on the polyvinylpyrrolidone with the formation of some form of complex or combination. This phenomenon does not take place when other water soluble polymers, such as vinyl alcohol and carboxymethyl cellulose, are used in place of polyvinylpyrrolidone.

In certain respects the polyvinylpyrrolidone iodine compositions of this invention may be considered as a novel form of water soluble iodine or a novel process for solubilizing iodine so as to obtain an aqueous solution of brown iodine which is non-toxic and in which the vapor pressure of the iodine is substantially reduced. Polyvinylpyrrolidone is preferred for producing such aqueous solutions of iodine since its non-toxicity has been established through its extensive use as a blood plasma substitute, and therefore, compositions having a wide field of application may readily be prepared. However, for general sanitizing purposes, where the matter of toxicity is not controlling, it has been found that other related polymeric materials are capable of forming a similar type of complex with iodine which is water-soluble. Among such related products may be mentioned water-soluble interpolymers of polyvinylpyrrolidone with other vinyl monomers such as vinyl phthalimide, vinyl pyridine, acrylamide and simply substituted acrylamides, and vinyl caprolactam. As examples of related homopolymers which may be combined with iodine in a similar manner to produce a water-soluble composition may be mentioned polyvinyl caprolactam, polyvinyl-$\gamma$-valerolactam and polyvinyl-$\epsilon$-valerolactam. The combinations of these related water-soluble polymers with iodine are also water-soluble and the iodine retains its killing action on microorganisms. However, the toxicity of such other polymers and of these combinations with iodine on humans and domestic animals has not been investigated and, therefore, these products cannot be recommended for use in applications where the toxicity is a controlling factor unless full investigation should show them to be safe. They are, however, useful in applications involving general sanitizing where toxicity is not a controlling factor.

The novel polyvinylpyrrolidone iodine compositions of the present invention, as well as the compositions of iodine with related water-soluble polymers, may be formulated with a wide variety of surface active agents such as anionic agents as soaps or alkylaryl sulfates and sulfonates, higher fatty alcohol sulfates and sulfonates, cationic agents such as quaternary ammonium surface active agents, and non-ionic surface active agents such as polyglycol ethers of alkyl phenols, and higher fatty alcohols or the polyglycol ether esters of higher fatty acids to produce valuable, cleaner sanitizers which have a wide field of application in cleaning and sanitizing operations, by washing, bathing, spraying, etc.

This application is a continuation-in-part of my co-pending application Serial No. 135,519, filed December 28, 1949, and now abandoned.

I claim:

1. A method of reducing the vapor pressure of free halogens selected from the group consisting of chlorine and iodine in compositions containing the same which comprises mixing with such free halogen containing products polymeric N-vinyl pyrrolidone.

2. Compositions containing free halogens selected from the group consisting of chlorine and iodine in which the vapor pressure of the free halogen is substantially reduced and characterized in that said compositions contain polymeric N-vinyl pyrrolidone.

3. The method of reducing the vapor pressure of free iodine in solutions containing the same which comprises mixing polymeric N-vinyl pyrrolidone with a solution containing free iodine.

4. A solution containing free iodine and polymeric N-vinyl pyrrolidone.

5. The method of reducing the vapor pressure of free halogens in solutions of alkali hypohalites which comprises mixing such solutions with polymeric N-vinyl pyrrolidone.

6. Method as defined in claim 5 wherein the alkali hypohalite is sodium hypochlorite.

7. A composition comprising a mixture of alkali hypohalite and polymeric N-vinyl pyrrolidone.

8. A composition comprising a mixture of sodium hypochlorite and polymeric N-vinyl pyrrolidone.

9. A composition containing free iodine and comprising a mixture of polymeric N-vinyl pyrrolidone and elemental iodine and a surface active agent.

10. A composition as defined in claim 9 wherein the surface active agent is a nonionic polyglycol ether surface active agent.

11. A composition in the form of a dry powder, comprising polymeric N-vinylpyrrolidone, and free iodine, characterized in that the vapor pressure of the iodine is substantially zero.

12. A composition in the form of a dry powder, comprising polymeric N-vinylpyrrolidone, and free iodine, characterized in that the vapor pressure of the iodine is substantially zero; and, further characterized, in that the ratio of free iodine to iodide ion is substantially 2:1.

References Cited in the file of this patent

UNITED STATES PATENTS

| | | |
|---|---|---|
| 2,077,298 | Zelger | Apr. 13, 1937 |
| 2,599,140 | Taub | June 3, 1952 |

OTHER REFERENCES

Murat Produits Pharmaceutiques, August 1949, volume 4, No. 8, page 352.

Chemical & Engineering News, February 19, 1951, page 664.

Hecht and Weese: "Ein neuer Blutflussigkeiterzatz," Munch. med. Wschr., 1943, No. 1, page 11 et seq.

Weese: "Blutersatzmittel," Die Pharmazie, volume 3, 1948, pages 337–340.